(12) United States Patent
Boussageon et al.

(10) Patent No.: US 7,194,081 B2
(45) Date of Patent: Mar. 20, 2007

(54) COMMUNICATION INTERFACE BETWEEN PC'S AND AUXILIARY PLATFORMS IN AN INTELLIGENT NETWORK

(75) Inventors: Thierry Boussageon, Fontenay le Fleury (FR); Thibaut Feuillet, Caen (FR); Jean-Luc Grimault, Mondeville (FR); Dominique Kergutuil, Voisins le Bretonneux (FR); Thierry Morel, Tourville sur Odon (FR)

(73) Assignee: France Telecom, Paris (FR)

( * ) Notice: Subject to any disclaimer, the term of this patent is extended or adjusted under 35 U.S.C. 154(b) by 343 days.

(21) Appl. No.: 10/415,727

(22) PCT Filed: Oct. 31, 2001

(86) PCT No.: PCT/FR01/03383

§ 371 (c)(1),
(2), (4) Date: May 2, 2003

(87) PCT Pub. No.: WO02/37864

PCT Pub. Date: May 10, 2002

(65) Prior Publication Data

US 2004/0013251 A1    Jan. 22, 2004

(30) Foreign Application Priority Data

Nov. 3, 2000    (FR) .................................. 00 14103

(51) Int. Cl.
*H04M 7/00*    (2006.01)
(52) U.S. Cl. ............................. 379/221.11; 379/221.08; 379/221.09

(58) Field of Classification Search ........... 379/201.01, 379/207.02, 221.08, 221.09, 221.11, 221.12
See application file for complete search history.

(56) References Cited

U.S. PATENT DOCUMENTS

| | | | | |
|---|---|---|---|---|
| 5,583,920 A | * | 12/1996 | Wheeler, Jr. ............. | 379/88.01 |
| 5,712,903 A | * | 1/1998 | Bartholomew et al. .. | 379/88.25 |
| 5,754,630 A | * | 5/1998 | Srinivasan ................ | 379/88.23 |
| 6,240,174 B1 | * | 5/2001 | Silver .......................... | 379/230 |
| 6,697,461 B1 | * | 2/2004 | Middleswarth et al. .. | 379/88.24 |

FOREIGN PATENT DOCUMENTS

EP    0 948 216 A2    10/1999

* cited by examiner

*Primary Examiner*—Bing Q. Bui
(74) *Attorney, Agent, or Firm*—Pearne & Gordon LLP

(57) ABSTRACT

This invention relates to user access device to intelligent services of an intelligent network (IN) comprising a service control point (2) that communicates with at least one group of physical entities (4, 6, 8) designed to provide at least one initial service element, and with several auxiliary platforms (10$_i$) designed to provide users with additional service elements for completing the initial service element.

According to the invention, the device also comprises a communication interface (12) that allows an auxiliary platform (10$_i$) to send the service control point (2) service element execution queries in real time, and receive the data for executing these additional services from this service control point (2) as a response.

11 Claims, 14 Drawing Sheets

FIG. 5

CtxDial: data identifying the dialogue

| Field | Type (ASN.1) | Required | Useful Values | Description |
|---|---|---|---|---|
| Version | Enumerated | Yes | Version 1-0 | Version number of the SCP-SE queries. |
| IDSv | String octet | Yes | 2 octets | Service identifier. |
| EntreDialSE | Enumerated | No | 0, 1, or 2 | Code allowing the SE to distinguish a reconnection request for call concatenation or after a no answer from the called party or after inputting "*". |

FIG. 6 txSrv: service data on Card call

| Field | Type (ASN.1) | Required | Useful Values | Description |
|---|---|---|---|---|
| Nench | Integer | Yes | 0-TYA.NREF | Number of call concatenations performed at the time the SCP-Card connects to an SE |
| NRDeMax | Integer | Yes | TYA.NRDE | = TYA.NRDE of the SCP-Card, maximum number of call renewals of called parties, all SE are included. |
| Enchaînement_autorisé | Boolean | No | 0 or 1 | Flag indicating if the concatenation of the service or call query of a number is authorised. |

FIG. 7

CtxDdr: data regarding the calling line and calling party

| Field | Type (ASN.1) | Required | Useful Values | Description |
|---|---|---|---|---|
| TypeTerm | Enumerated | Yes | 0 or 1 | Terminal type (0 = non ISDN publiphones, 1 = other). |
| CgPCateg | String octet | Yes | 1 octet | CallingPartyCategory of the calling party. |
| NatDdr | Enumerated | No | 0 or 1 | National nature (o) or international nature (1) of the calling party. |
| NresDdr | VisibleString | No | 24 digits max. | Calling party network number. |
| PrefFd | VisibleString | No | 24 digits max. | France Direct prefix. |

FIG. 8

CtxCarte: part of the data sent to the AC and its response

| Field | Type (ASN.1) | Required | Useful Values | Description |
|---|---|---|---|---|
| Ipas | NumericString | No | 19 digits max. | Card number input by the subscriber (or sent by the AC in the case of fast authentication). |
| Code | NumericString | No | 6 digits max. | Confidential code of the subscriber. |
| Ilas | NumericString | No | 16 digits max. | Account number |
| Tsc | Enumerated | No | 0, 1, or 2 | Card service type (INT (0) / NAT (1) / SPE (2)). |
| Cco | Integer | No | 0-15 | Consumption class of the card. |
| Catc | Enumerated | No | 0, 1, 2, or 3 | Card category (with chip (0), without chip (1), maintenance 1 (2) or maintenance 2 (3)). |
| Scom | Octet string | No | 12 octets | Additional services related to the card. |
| Imi | Integer | No | 0-255 | Standby message indicator. |
| Cptx | Integer | No | 0-FFFFFFFFh | Indication of the card limited by the corresponding credit (in UT cents). |
| Appel_urgent_sans crédit | Null | No | present/absent | Flag indicating whether the SCP is on an urgent call without credit (CRES 64 of Authentication Centre). |
| Exception rejet | Null | No | Present/absent | Flag indicating whether the SCP is in a reject exception acceptance case. |

*FIG. 9*

CtxCarte: part of the data sent to the AC and its response

| Field | Type (ASN.1) | Required | Useful Values | Description |
|---|---|---|---|---|
| Ipas | NumericString | No | 19 digits max. | Card number input by the subscriber (or sent by the AC in the case of fast authentication). |

FIG.10

Parameters sent to the auxiliary platform:

| Field | Type (ASN.1) | Required | Useful Values | Description |
|---|---|---|---|---|
| CFDial | Enumerated | Yes | 0, 1, 2, 49, 50, 99, 100, 101 | Code of the SCP-SE dialogue end |

FIG.11

Parameters received form the SCP-Card from the auxiliary platform:

| Field | Type (ASN.1) | Required | Useful Values | Description |
|---|---|---|---|---|
| Saisi_CC | VisibleString | Yes | 25 digits max. | Card-code sequence entered or said by subscriber |
| TypAuth | Enumerated | No | 0, 1, or 2 | Code of the authentication type determined by the SE. |

*FIG.12A*

Parameters returned by the SCP-Card:

| Field | | Type (ASN.1) | Required | Useful Values | Description |
|---|---|---|---|---|---|
| Code Retour | Numéro | Integer | Yes | 0-65532 | Return code number. |
| | Annonce | Integer | No | 0-255 | CPxxx.announcement number. |
| | FinAppel | Null | No | Present/absent | Flag indicating to the SE, in case of there is an error in the return code, if the error blocks the SCP-Card. |
| Ipas | | Numeric String | No | 19 digits max. | Card number input by the subscriber (or sent by the AC in the case of fast authentication.) |
| Code | | Numeric String | No | 6 digits max. | Confidential code of the subscriber. |
| Ilas | | Numeric String | No | 16 digits max. | Account number. |
| Tsc | | Enumerated | No | 0, 1, or 2 | Service type of the card (INT (0) / NAT (1) /SPE (2)). |
| Cco | | Integer | No | 0-15 | Consumption class of the card. |
| Catc | | Enumerated | No | 0, 1, 2, or 3 | Card category (with chip (0), without chip (1), maintenance 1 (2) or maintenance 2 (3)). |
| Scom | | Octet string | No | 12 octets | Additional services related to the card. |
| Imi | | Integer | No | 0-255 | Standby message indicator. |
| Cptx | | Integer | No | 0-FFFFFFFFh | Indication of the card limited by the corresponding credit (in UT cents). |
| NbAuthMax | | Integer | No | PAR.ECH2 | Maximum number of authentication attempts allowed by the SCP-Card. |

*FIG. 12B*

| OptAuth | Integer | No | 0-PAR.ECH2 | Counter of the number of authentications performed. |
|---|---|---|---|---|
| Enchainement:auto risé | Boolean | No | 0 or 1 | Flag indicating if the service or call query concatenation of a number is authorised. |
| Appel_urgent_sans_crédit | Null | No | present/absent | Flag indicating whether the SCP is on an urgent call without credit (CRES 64 of Authentication Centre). |
| Exception_rejet | Null | No | Present/absent | Flag indicating whether the SCP is in a reject exception acceptance case. |

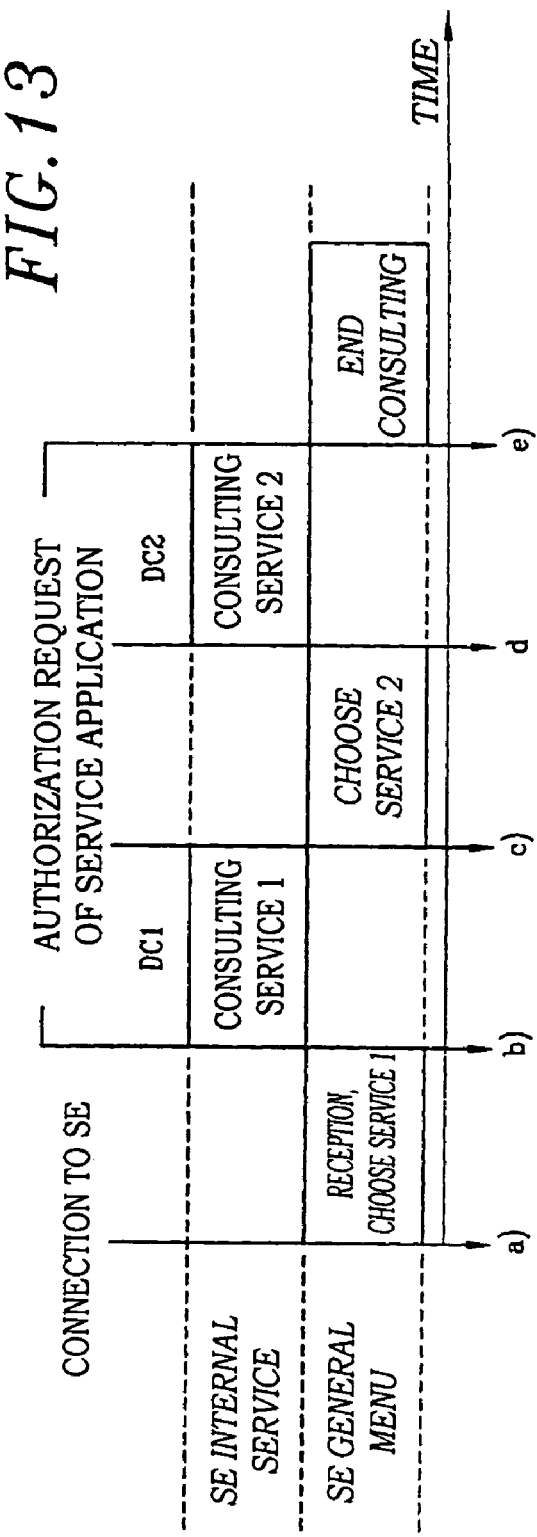
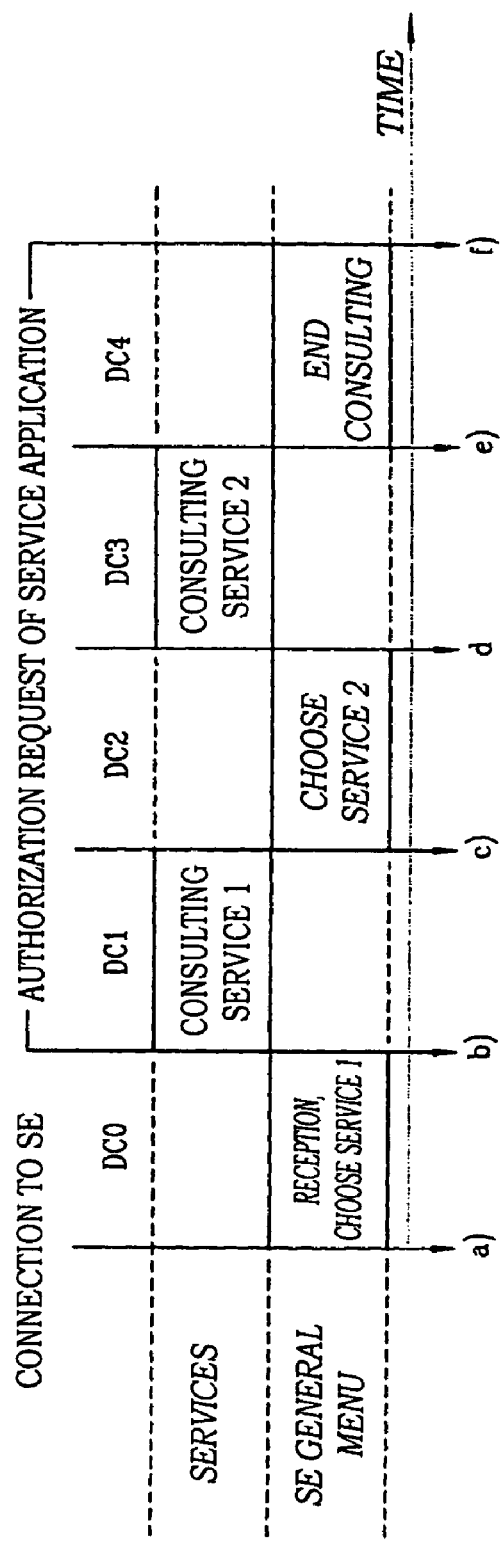

FIG. 15

Parameters received from the auxiliary platform:

| Field | Type (ASN.1) | Required | Useful Values | Description |
|---|---|---|---|---|
| Valo | Sequence | No | Present/absent | Flag indicating whether the value increase processing of the previous service must be performed. |
| ModeTax1 | Enumerated | No | 0 to 3 | Code indicating the call charge mode of the previous service. |
| Aut | Sequence | No | Present/absent | Flag indicating whether the service authorisation process should be performed. |
| Numéro | VisibleString | No | 24 digits max. | Called party or service number |
| AnnCrédit | Boolean | No | 0 or 1 | Flag indicating if any credit announcements should be transmitted by the SCP-Card. |
| ApTar | Sequence | No | Present/absent | Flag indicating whether the service rate application processing should be applied. |
| Application_tarif_inmédiate | Boolean | No | 0 or 1 | Flag indicating whether the SCP-Card should save the service query start time after the CD is opened. |

FIG. 16

Parameters received from the auxiliary platform

| Field | Type (ASN.1) | Required | Useful Values | Description |
|---|---|---|---|---|
| NumDdé | VisibleString | No | 24 digits max. | Empty or requested number |
| RappelSE | Enumerated | Yes | 0, 1, or 2 | Indication of reconnection to SE after an effective calling party-called party conversation. |
| Appel_opérateur | Boolean | Yes | 0 or 1 | Call to operator |
| Contexte B | Octet string | Yes | 30 octets max. | SE internal data |

COMMUNICATION INTERFACE BETWEEN PC'S AND AUXILIARY PLATFORMS IN AN INTELLIGENT NETWORK

This invention relates to a user access device to IN (intelligent network) services and method comprising a service control point that communicates with at least one group of physical entities designed to ensure at least one initial service element, and with several auxiliary platforms designed to provide the user with additional service elements for completing the initial service element.

Intelligent networks comply with ITU-T recommendations Q.120x, Q121x, Q.122x and Q.123x and stem from the need to provide access to services that invoke several applications such as voice, electronic messaging, file transfer, or transactional processing, etc. services, by centralising their control. Generally, applications are linked to perform a new service by using the architecture implemented in the application layer.

To allow the existing infrastructure in the communication network to take on the functionalities of the new service, intelligent networks implement the following standardised functional entities:

Service Control Function (SCF), whose corresponding physical entity in the IN network architecture is a Service Control Point (SCP);

Service Switching Function (SSF), whose corresponding physical entity is a Service Switching Point (SSP);

Service Data Function (SDF), whose corresponding physical entity is a Service Data Point (SDP);

Specialised Resource Function (SRF), whose corresponding physical entity is an Intelligent Peripheral (IP).

Service Management Function (SMF), whose corresponding physical entity is a Service Management Point (SMP).

In known IN services, the Service Control Function (SCF) supports a user interface that implements an important part of the Service Control Function (SCF). This user interface ensures:

all the actions implemented by the service to inform users and prompt them to make their choices;

all the actions of the device that collect the user's choices;

release and concatenation of these actions such as invitations and collection of choices;

concatenation of these actions with other service call processing actions.

FIG. 1 provides a diagram illustrating a known device for accessing an NI service in which a service control point 2 communicates with a service database 4, an access switch 6 to which the user telephone line 7 is connected, a service management point 8, and several auxiliary platforms $10_i$. An auxiliary platform $10_i$ can be either an intelligent peripheral containing specific resources to allow adapting service controls on user demand, or a value-added server such as a messaging server, a service management point informing users of their consumption or any other type of server. The auxiliary platform can also be another service control point when two intelligent networks are connected within the same call.

The resources of an intelligent peripheral can be announcers, speech synthesis equipment, speech recognition equipment, equipment required for videoconferencing, tone generators, speech synthesis tests or protocol converters, etc.

When an auxiliary platform is an intelligent peripheral, two situations may arise:

the service control point 2 manages all the service control functions, for example, in a card service in which the service control point 2 manages the launching of the card and code digit input phase, the launching of the authentication based on the digits entered, the verification of the card's rights, the launching of the requested number entered, the verification of the rights that the card has to call this number, the number call, as well as the concatenation with the next call.

the service control point 2 assigns certain subtasks to the intelligent peripheral, in lesser or greater numbers depending on whether the intelligent peripheral is used in "step" or "script" mode.

In "step" mode, the intelligent peripheral is completely controlled by the service control point 2 that, during an initial command, instructs it to, for example, transmit a specific message to a user, and in another command, collect the user's choice.

In "script" mode, the intelligent peripheral has some latitude in concatenating certain user interface subtasks such as the transmission of an invitation message, collection of the user's choice and transmission of another invitation message.

In both cases, the intelligent peripheral performs the requested task and recognises the service control point 2 without ever self-concatenating the tasks it has been assigned. Moreover, the intelligent peripheral never concatenates user interface phases with other IN service phases. It is only used as an additional service control module 2 resource to ensure specialised functions, which are often voice functions.

This centralization of the service control function (SCF) at the service control point 2 does prevent the user interface from developing quickly. Indeed, the part of the user interface functionalities that resides in the service control point 2 and used to configure, launch, and concatenate the tasks requested from the intelligent peripheral is often embedded in a monolithic software application that covers all call processing. Therefore, any modification in user interface functionality requires modification of the service control module 2, at the level of data transmitted to the intelligent peripheral for executing the tasks it has been assigned, at the phase concatenation level, and on the intelligent peripheral in order to modify the subtasks and the type of data to be received from the service control module 2. This results in a lack of flexibility in the development of the service because of the need to perform non-regression tests as soon as a modification is made on the service control point 2 software application. This prolongs the development/validation cycles.

Furthermore, when an auxiliary platform is a value-added server, there are no ITU-T recommendations or international standards governing exchanges. Moreover, operators have their own specifications that are sometimes slightly different from the standards.

When an auxiliary platform is a second service control point, there is no data exchange mode between these two service control points managing various services in two different intelligent networks.

This leads to a heterogeneity of communication interfaces between the various auxiliary platforms and the service control module, which results in the need to store the service control point 2 of several different software applications in the random access memory, making the service control point more complex and hindering service development.

The object of the invention is to provide new distribution of service control functions between the service control point and the auxiliary platforms in which the IN service user interface is transferred over to external platforms, which are specialised machines that can concatenate all the user interface stages, while not being interface tributaries with other equipment in the intelligent network.

Another goal of the invention is to eliminate the heterogeneity of interfaces between the service control module and the various auxiliary platforms in order to allow services to evolve without modifying the functions dedicated to the service control point.

According to the invention, the access device comprises a communication interface that allows an auxiliary platform to send the service control point service element execution queries in real time, and receive data that allows executing additional services from this service control point, as a response.

According to the invention, for a given service, the queries sent to the service control point have the same format, regardless of the transmitting auxiliary platform, and the data sent by the service control point to the transmitting auxiliary platform have the same format.

According to the invention, the first service element that the auxiliary platform requests from the service control point is a user authentication, access authorisation or a number call.

Thanks to the invention, the service control point SCP is relieved from managing additional services, which is transferred over to the auxiliary platforms. Therefore, the development of a new service variant does not involve modifying the service control point if this development only applies to the user interface or additional services. Developments of service variants are therefore easier, since they are more common on external platforms than on the service control point.

Moreover, the cycle times of service developments are reduced in the sense that it is no longer necessary to perform non-regression tests on the aspects, network, control, charging, etc. of the NI service because they remain under the control of the SCP, and only the auxiliary platforms evolve with the user interface or the additional services.

Furthermore, the genericity of the communication interface queries according to the invention allow taking into account the various types of auxiliary platform and, in particular, to solve the problem of interoperation of the intelligent network services when the auxiliary platform is a SCP of another NI.

The user access procedure to the NI service includes the following stages:

real-time sending by the auxiliary platform to the service control point of at least one execution query of a first service element dedicated to the service control;

sending by the service control point to the transmitting auxiliary platform of the data query that allows the latter to execute additional services.

Other characteristics and benefits of the invention will be provided in the description to follow, to be taken as a non-limiting example and referencing the attached figures in which:

FIG. 1 provides a diagram partially illustrating the links between functional entities of a prior art intelligent network:

FIG. 2 provides a diagram partially illustrating the links between functional entities of an intelligent network according to the invention.

FIG. 3 provides a diagram illustrating an initial mode of communication between an auxiliary platform and a service control point according to the invention;

FIG. 4 provides a diagram illustrating a second mode of communication between an auxiliary platform and a service control point according to the invention;

FIGS. 5 to 12 and 15 and 16 represent tables that illustrate the formats of the data exchanged between a service control point and an auxiliary platform in a specific application according to the invention.

FIGS. 13 and 14 illustrate the concatenation of two services implementing the procedure according to the invention.

Figure 1:
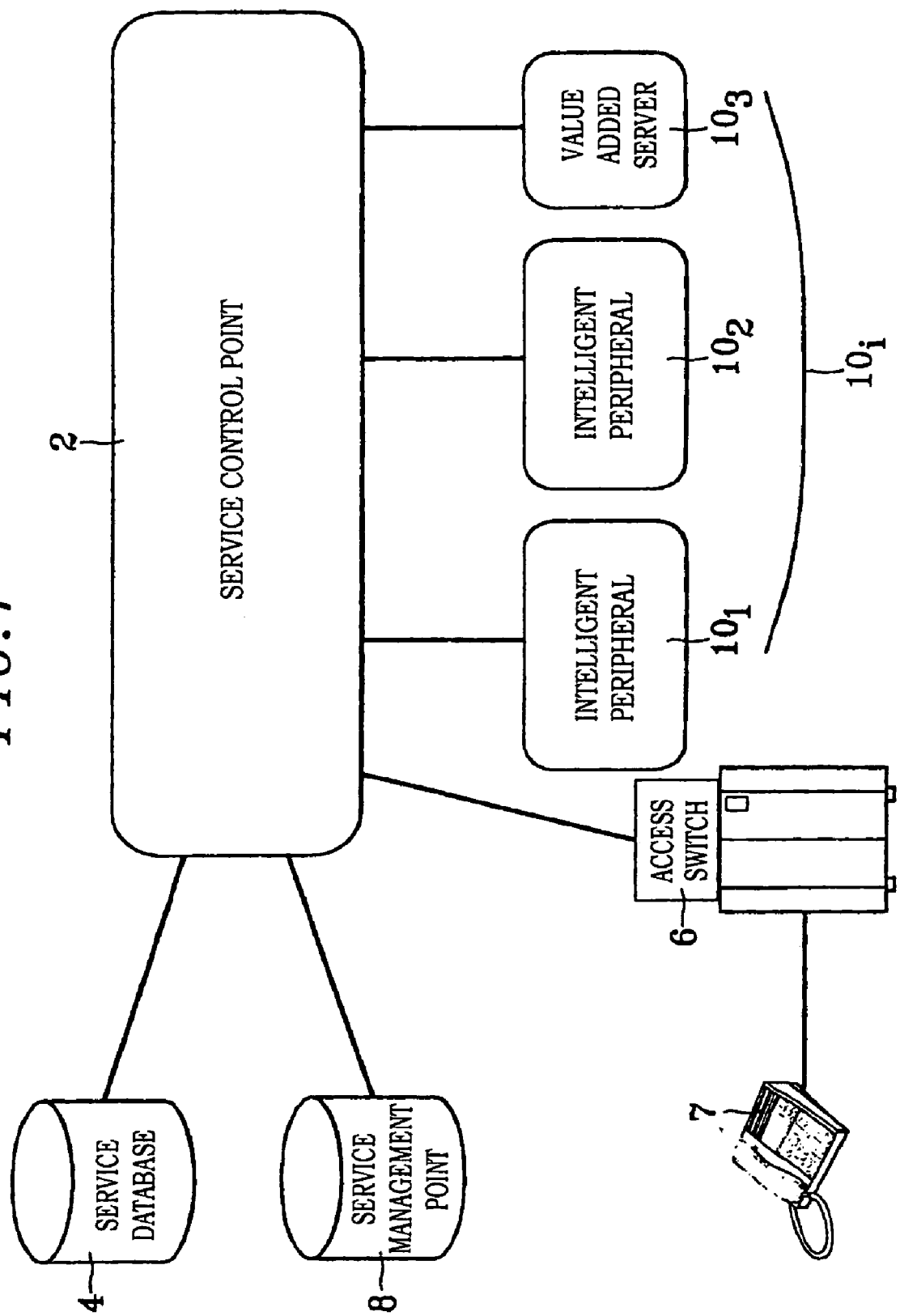

FIG. 1 described above, illustrates a device for accessing an IN service in which a service control point 2 communicates with a service database 4, an access switch 6 to which a user telephone line 7 is connected, a service management point 8 and several auxiliary platforms $10.sub.i$. An auxiliary platform indiscriminately designs an intelligent peripheral $10.sub.1$, $10.sub.2$, a value-added server $10.sub.3$ such as a voice-messaging server, a voice interactive server or a second IN service control point.

Figure 2:
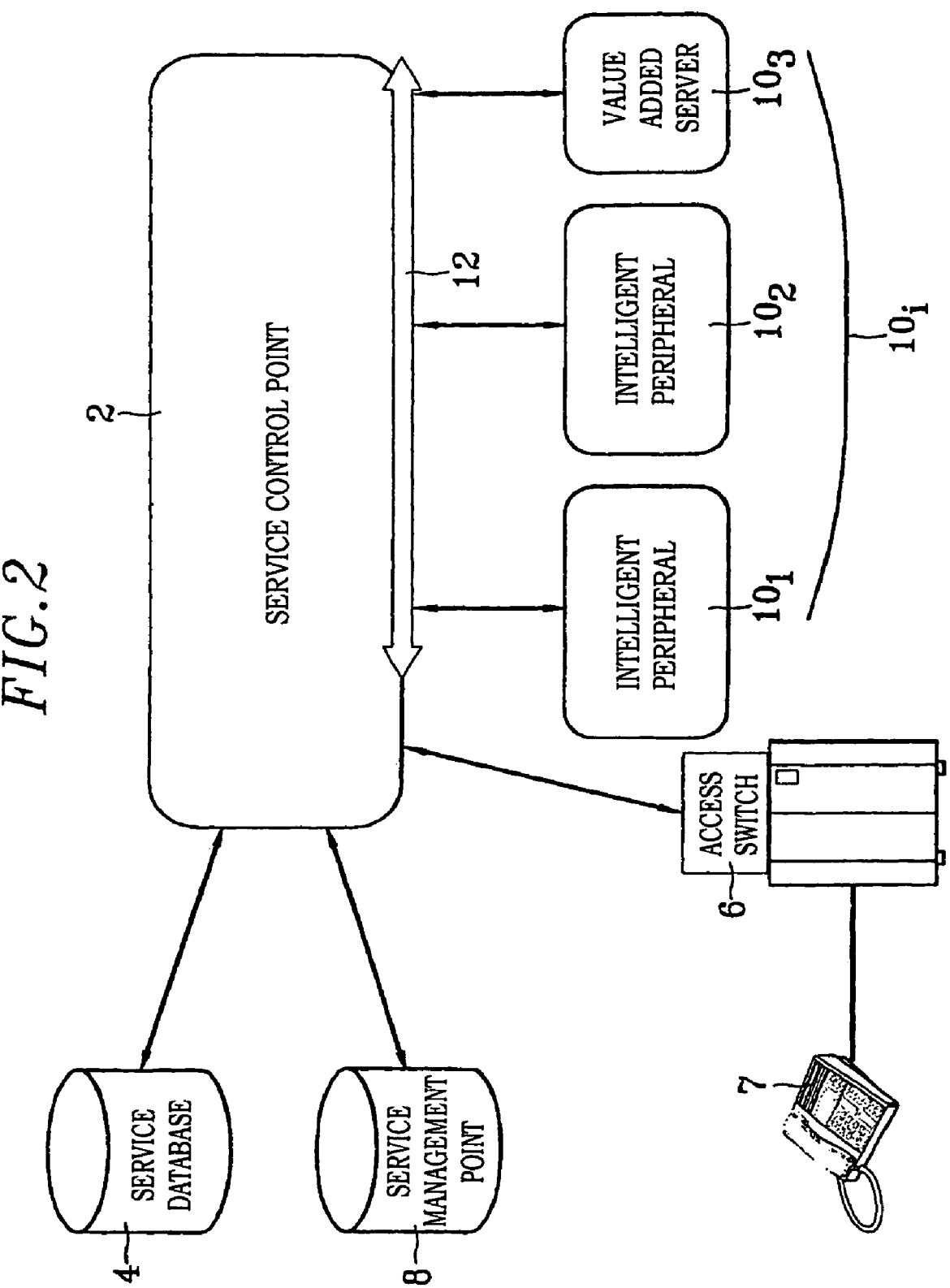

According to the essential characteristic of the invention, illustrated by FIG. 2, a communication interface 12, fitted between service control point 2 and the auxiliary platforms $10_i$, allows an auxiliary platform $10_i$ to send the service control point 2 an initial service element execution query in real time. This initial service element can be user authentication, access authorisation or the number call. The service control point 2 executes this initial service element and resends data in response to the query sent to allow the transmitting auxiliary platform $10_i$ to execute its dedicated additional services. The auxiliary platform then transmits other queries to the SCP so that the latter can execute its dedicated service elements.

Figure 3:
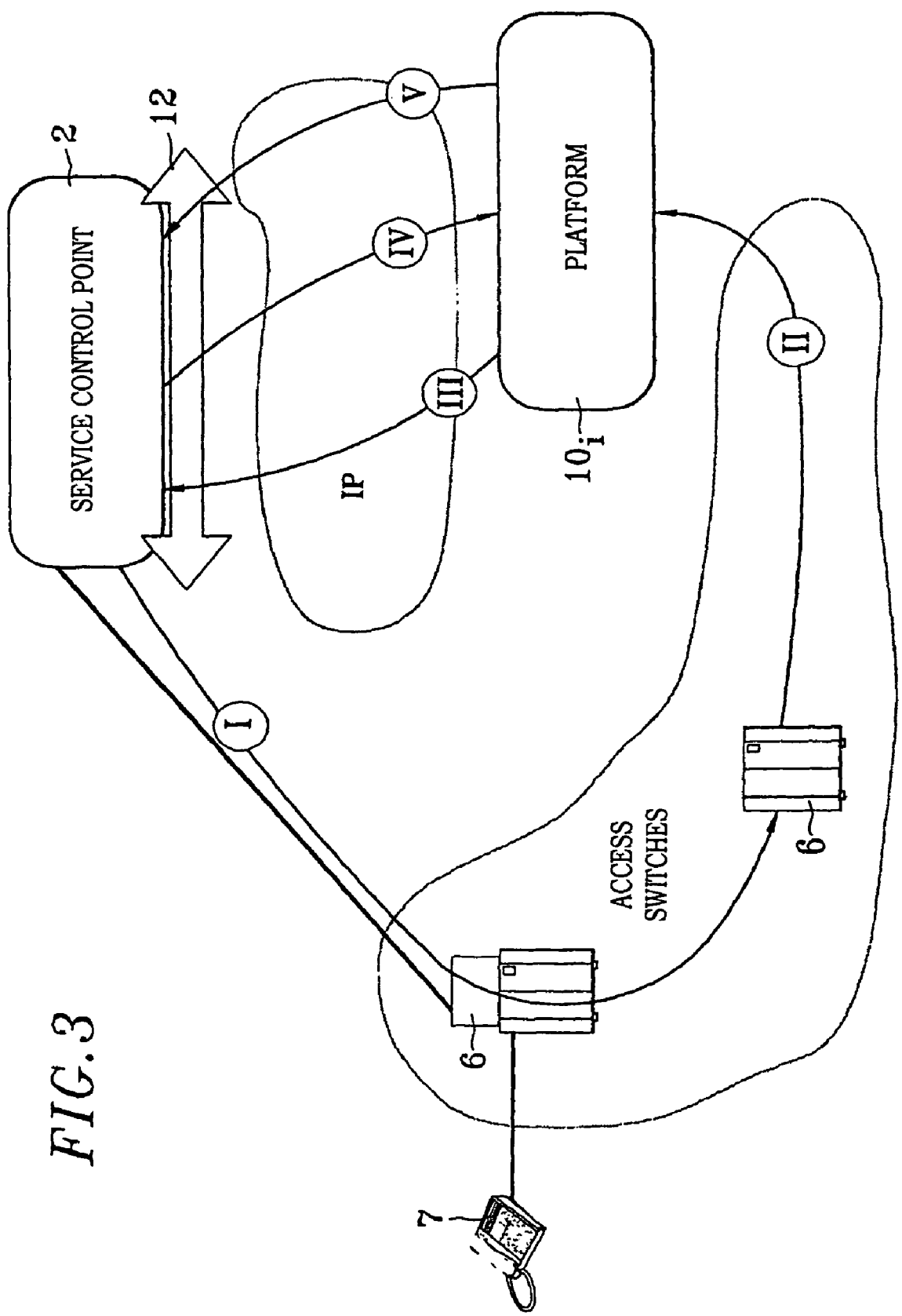
Figure 4:
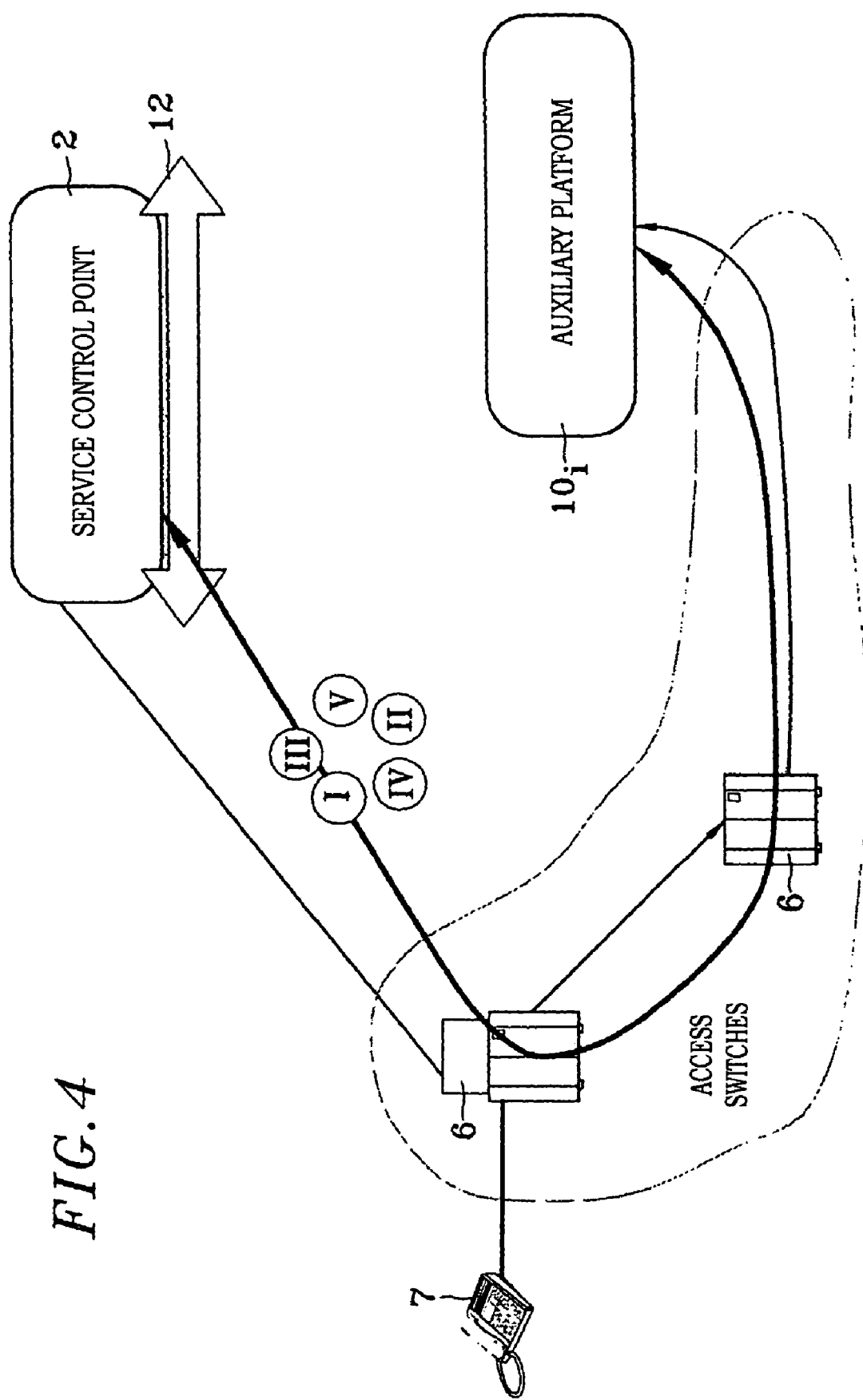

Query transmission can be done through a direct link, such as the one illustrated in FIG. 3, via TCP/IP (Transmission communication protocol/Internet protocol) or the SS7 (Signalling System N°7) protocol, or through a relay link, such as the one illustrated in FIG. 4, using the same path as the related speech circuit. In this case, because queries are transported in the speech path signalling, the platform can easily create the link between the application queries and voice communication. This is not the case with a direct link because both links are initialised, the first link to carry the queries over the IP (Internet Protocol) network or over the SS7 network, and the second link to carry the speech signals. Therefore, it is necessary for the auxiliary platform $10_i$ and the service control point 2 to synchronise the two links. The mechanism used for this synchronization is based on the use of a reference and is illustrated in FIG. 3 in the case of an IP link. This mechanism is the same for a direct link via the SS7 protocol.

With reference to FIG. 3, the sequencing of the TCP/IP link using the reference is as follows:

I The service control point 2 launches a voice call via the access switch 6 to a platform $10_i$. An "R" reference is placed in the signalling that sets up this call, for example, National ISDN User Part (ISUP) signalling. This "R" reference comprises the reference for the future exchange session for auxiliary platform/service control point 2 application queries.

II The voice call arrives at the platform that reads in the speech path signalling the "R" reference of the session of queries exchanged with the service control point 2.

III The platform transmits an initialization query containing the "R" reference over the TCP/IP link.

IV Using the "R" reference, the service control point 2 creates the link between the call being sent to the platform $10_i$ over the speech path and the initialization query, and responds to the initialization query by transmitting the response to this initialization query to the platform $10_i$ over the TCP/IP link; this response also contains the "R" reference so that the platform $10_i$ can identify the voice call to which this response is related.

V The platform $10_i$ transmits other application queries over the TCP/IP link according to the service that it initialises, for example, an authentication request.

Whatever query is transmitted over the TCP/IP link, it contains the "R" reference; the response transmitted by the SCP over the TCP/IP link also contains this "R" reference. Also, during the entire query exchange session over the TCP/IP link, the platform $10_i$ and the service control point 2 can join the query session to the voice call.

In the case of a relay link, the sequencing is the same as in the case of a link over TCP/IP, except that the reference is not useful because network signalling naturally creates the link between these queries and the speech path on which the queries are based. The two streams in fact follow the same channel.

Sequences I to V correspond to their equivalents in TCP/IP mode illustrated in FIG. 3.

To better highlight the parameters exchanged between an auxiliary platform $10_i$ and the service control point 2, a specific application will be described in which the intelligent service is a Card telecommunications service. The service control point 2 will be designated in the next phase using the SCP-Card expression, and auxiliary platforms $10_i$ will be external servers designated by the SE expression.

In terms of operation, the SCP-Card responds to the initialization query of the dialogue between the Card Application and the application that resides in the auxiliary platform $10_i$ by sending an initialisation request with the following structure:

R-Initialisation_PCS={Contexte_A, Contexte_B}
Contexte_A={CtxDial, CtxSrv, CtxDdr, CtxCarte, CtxInfo}
Contexte_B={BufferSE}

FIG. 5 includes a table that explains the CtxDial parameter representing the data that identifies the dialogue.

The Version field allows simultaneously managing two versions of the query description: a new version N and the previous version N-1. It indicates to the auxiliary platform $10_i$ the version in which the queries will be transmitted up to the end of the SCP-SE dialogue.

The service number in the application will be taken from the IdSv service identifier by the auxiliary platform $10_i$ application, if required.

If the SCP-Card connects to an auxiliary platform $10_i$ to initiate a voice dialogue over this auxiliary platform $10_i$, the CodeReprise field is absent.

If the SCP-Card reconnects to an auxiliary platform $10_i$ to resume and track a voice dialogue, the EntréeDialSE field increases in value as follows:

EntréeDialSE=0 if the auxiliary platform $10_i$ is recontacted after the calling party enters "*" during the call return. This is not taken into account for services using voice recognition.

EntréeDialSE=1 if the auxiliary platform $10_i$ is recontacted after a no answer by the called party.

EntréeDialSE=2 if the auxiliary platform $10_i$ is recontacted after the called party hangs up (call concatenation).

FIG. 6 includes a table that explains the CtxSrv parameter that represents the service data over the Card call.

The NEnch parameter indicates the number of call concatenations the calling party performs on the SCP-Card before connecting to the auxiliary platform $10_i$ or between connections to different auxiliary platforms $10_i$. The number of call concatenations is accumulated from the start of the Card call.

NRDeMax is the maximum number of called party call renewals authorised by the SCP-Card.

FIG. 7 includes a table that explains the CtxDdr parameter that represents the data over a calling line and the calling party.

The values for TypeTerm, CgPCateg, NatDdr, NResDdr, and PrefFD increase starting from the Provide at the beginning of the Card call and by analyzing the calling party number.

FIG. 8 includes a table that illustrates the CtxCarte parameter that represents part of the data sent to the authentication centre AC and its response.

These parameters can only be provided when the codecard input and the Authentication Centre query are performed by the SCP-Card before connecting to the auxiliary platform $10_i$.

The value of Ipas increases upon inputting the subscriber card number or the response sent by the authentication centre AC in the case of fast authentication.

The remaining fields can be completed using the values provided by the Authentication Centre (AC).

Note that the Code field representing the subscriber confidential code will only be transmitted to the auxiliary platform $10_i$ under exceptional circumstances for example, in an auxiliary platform $10_i$ application that allows subscribers to modify their confidential code.

FIG. 9 provides a table explaining the CtxInfo parameter that represents additional data.

The NumDdé parameter is useful if the auxiliary platform $10_i$ is a voice messaging system that offers differed call service.

The TransMV field is also designed for a voice messaging type auxiliary platform and allows specifying the cause of the retransmission toward this messaging system if needed: no answer, busy, congestion, during a called party call.

MaxCom represents the maximum authorised communication duration, calculated in seconds by the Rate Server (RS) that resides in the service management point. This field can only be completed if the requested number has been input and a query of the service management point 8 has been performed by the PCS-Card before the connection request to the auxiliary platform $10_i$.

The RefAppel field is a sequence of 15 octets that breaks down as follows:
- octets 1 to 5: DATE field=start of call processing, DCB-coded in the following format: MMDDhhmmss.
- octets 6 to 7: CPAYS fields=SCP country code (DCB-coded).
- octets 8 to 11: IDPCS field=SCP identifier (SGTQS code), ASCII-coded without parity.
- octets 12 to 15: REFC field=circular reference, hexadecimal-coded.

The maximum length of the CaracServ field is 16 octets:
octet 1: CARSRV field=characteristic parameters of the Intelligent Network services. It is coded on an octet in the following manner (where A is the low-order bit):
A=1, rerouting not allowed (i.e., Audiotel or Toll Free). Else A=0.
B=1, Call Completion not allowed (i.e., 12). Else B=0.
C=1, AOCD (requested telephone charge). Else C=0.
D=1, parsing is not allowed without transmitting the response signal. Else D=0.
E, F, G, H on standby and set to =0.

octet 2: SVTR field=crossed services, value increase to 0Fh.

The Contexte_B field is used at the service control point to pass the data previously transmitted by the auxiliary platform.

This field is useful when the service control point and the auxiliary platform recover a dialogue after it has been interrupted, for example, during call concatenation. The service control point does not interpret the field that contains the data belonging to the auxiliary platform, as does the indication of a recovery point in its service script. Note that when recovering dialogue for call concatenation, the auxiliary platform can be the same type of platform as the one used previously, but must be a different sample.

Each time that the SCP-Card wants to completely release the connection to the auxiliary platform $10_i$, it first transmits a Release SCP query to the auxiliary platform. The purpose of this query it to allow the auxiliary platform $10_i$ to release its own resources and be able to transmit, in this particular case, a notification to the calling party before the SCP-Card cuts off the link. Therefore, the SCP-Card will always wait for the response to the Release SCP to the auxiliary platform $10_i$, or possibly, the timeout of no-answer to this query, before transmitting the FREE operation on the auxiliary platform link.

FIG. 10 indicates a table illustrating the card of parameters sent to the auxiliary platform $10_i$ in a Release SCP query to the auxiliary platform.

For some end-of-dialogues causes, the auxiliary platform $10_i$ will not be able to transmit voice messages to the calling party. For example, if the Release SCP query to the auxiliary platform is sent after a number call request and hang-up request, the SCP-Card must immediately cut the calling party-auxiliary platform $10_i$ voice circuit (SPLIT) to establish the calling party-called party voice circuit (JOIN). The list of CFDial codes therefore distinguishes the situations where the auxiliary platform $10_i$ may or may not have a voice link with the calling party until it sends its response:

CFDial=0 to 49: the auxiliary platform $10_i$ does not have a voice link with the calling party.

CFDial=50 to 255: the auxiliary platform $10_i$ has a voice link with the calling party up to the moment it transmits its response to the Release SCP query to the auxiliary platform; it will therefore be able to transmit a message to the calling party.

The CFDial codes≧100 designate the errors detected by the Card Application Driver and sent to the application so that the latter can end the dialogue between the SCP-Card and the auxiliary platform $10_i$ using a Release SCS to the auxiliary platform.

The SCP-Card continues its processing according to the cause of the CFDial dialogue end:

If CFDial=0: processing standby for called party response.

If CFDial=1: processing the communication follow-up with the called party.

Receipt of the auxiliary platform response awaited and processed in the corresponding statuses.

For the other CFDial values, the SCP-Card awaits acknowledgement by the auxiliary platform $10_i$ before launching a call end process. If the auxiliary platform $10_i$ acknowledgement is not received, the SCP-Card also launches a call end process. In any case, receipt of the auxiliary platform $10_i$ response allows the SCP-Card to release the link to the auxiliary platform $10_i$ and increase the value of the communication part of the service it offers, the closing, if needed, and the sending of a communication detail.

The SCP-Card transmission of an initialisation response is followed by a series of application queries that the auxiliary platform transmits to the SCP-Card. These are described below.

Of course, application processing of the SCP-Card upon receipt of the queries from the auxiliary platform are given for information purposes for the Card Application using the control interface according to the invention.

If the query is an authentication request, an auxiliary platform $10_i$ requests the authentication of a card-code from the card Authentication Centre via the SCP-Card. The acknowledgement of the card-code digits is completely dedicated to the auxiliary platform $10_i$ that performs the following tasks:

invitation to dial or say the numbers;

repetitions in case the user has not input or said the numbers:

possible format or length controls, etc.

Note that to query another Card Application Authentication Centre, this request might need to be developed or specifications of other authentication queries might be needed because the types of data residing in these centres may vary from one application to another.

FIG. 11 represents a table that explains the parameters received from the auxiliary platform $10_i$ for this authentication request.

Several types of authentication are possible on the SCP-Card. The SCP-Card identifies these types of authentication using the card-code sequence format input by the user:

Format 1: low-grade authentication: "i digits" (i=9 card digits+4 code digits).

Format 2: low-grade authentication after the set passes to DTMF: "#+i" or "*+i digits" (i=13).

Format 3: fast authentication: "j digits" (j=4 digits of the code only).

Format 4: fast authentication after the set passes to DTMF: "#+j digits" or "*+j digits" (j=4).

Format 5: high-grade authentication: "##+k digits" or "+#+k digits" (k=19 maximum).

The auxiliary platforms $10_i$ have two possibilities:

the auxiliary platform $10_i$ does not know the low-grade, high-grade, or fast authentication notions, in which case, it sends the SCP-Card a unique card-code sequence corresponding to the raw information input or said by the user and concatenated into a single sequence (Saisie_CC), even if the acquisition is performed in several stages on the auxiliary platform $10_i$. The TypAuth field is therefore absent from the query.

the auxiliary platform $10_i$ is aware of the four types of authentication and is able to offer them to the user or identify them when the user inputs/says them, in which case, the auxiliary platform $10_i$ sends the SCP-Card the concatenated card number and the code number (Saisi_CC), without the "+", "#", "##", or "*#" identifiers, but with the type of authentication recognised by the auxiliary platform $10_i$ TypAuth:

TypAuth=0: low-grade authentication (format 1 or 2).

TypAuth=1: fast authentication (format 3 or 4).

TypAuth=2: high-grade authentication (format 5).

In both cases, the SCP-Card does not receive the end delimiter if the input is received in DTMF mode on the auxiliary platform $10_i$.

FIG. 12 represents a table illustrating the parameters returned by the SCP-Card in response to this authentication request.

The CodeRetour parameter is common to all responses of the auxiliary platform queries to the SCP-Card. It comprises:
- a Numéro field whose value is systematically 0 if the query was processed correctly, and a positive value associated to the error found, otherwise.
- an Annonce field: contains the OSV announcement number that the SCP would use if an error occurs, corresponding to the mode without a control interface. This field is optional.
- a FinAppel field: set to NO, it may allow the auxiliary platform $10_i$ to continue its voice dialogue if the error does not block its processing, and to repeat the query or concatenate a new one (example: the authentication centre CRES indicates that the code does not match). When set to YES, it indicates to the auxiliary platform that the SCP-Card cannot continue the call. The auxiliary platform $10_i$ must inform the user of the error and send a "Release auxiliary platform to SCP" query (example: no answer from authentication centre without accepting the reject exception).

The Ipas card number is systematically retransmitted to the auxiliary platform $10_i$, whether it has performed the Saisi_CC sequence analysis or not.

The Code (user confidential code) field is only transmitted to the auxiliary platform under exceptional circumstances (example: auxiliary platform $10_i$ application that allows a user to modify his or her confidential code).

The Ilas, Tsc, Cco, Catc, Scom, Imi, and Cptx parameters are a copy of the parameters provided by the Authentication Centre. If the Card is not limited, Cptx and Imi will be absent.

NbAuthMax and CptAuth allow the auxiliary platform $10_i$ to modulate its card-code input announcements (first, nth, or last announcement), or to offer help after a specific failure rate.

Enchaînement_autorisé, Appel_urgent_Sans_crédit and Exception_rejet are derived by the SCP-Card from the type of authentication centre (AC) response and the call context. They are transmitted to the auxiliary platform $10_i$ to direct the processing of its voice script.

When a query sent by the auxiliary platform $10_i$ is an authorisation and service value increase request, the service term of the query designates not only an auxiliary platform $10_i$ internal service number, but also a requested number joined by the auxiliary platform $10_i$, as well as a number requested and joined by the SCP.

The authorization and service value increase request is sent by the auxiliary platform $10_i$ to increase the value of the previously queried service cost, authorise the user to consult the selected subsequent service and, if needed, open a new communication detail CD for this service.

Query processing by the SCP-Card comprises three stages:
- Value increase processing of the previous communication (calculation of the duration, cost, CD transmission, decrease of possible limit of the card).
- Authorisation processing on the subsequent service (number analysis, possible authorization/translation of a CD transmission, SdT credit query).
- Rate Application processing of the subsequent service (opening of its CD).

The input parameters of the query (Valo, Aut, and ApTar) will indicate the processing performed by the SCP-Card before sending the CodeRetour.

FIG. 13 illustrates an example in which a subscriber concatenates two internal SV1 and Sv2 services over a single free access auxiliary platform $10_i$ that includes the following stages:
a) Connection to the free access auxiliary platform $10_i$. No communication details (CD) are opened in the case of free access;
b) (Valo, Aut, ApTar)=(0, 1, 1). Authorisation request on service 1 and opening of communication detail CD1.
c) (Valo, Aut, ApTar)=(1, 0, 0). Value increase of communication detail CD1.
d) (Valo, Aut, ApTar)=(0, 1, 1). Authorisation request on service 2 and opening of communication detail (CD2).
e) (Valo, Aut, ApTar)=(1, 0, 0). Value increase of communication detail CD2.

FIG. 14 illustrates an example in which a subscriber concatenates two internal SV1 and Sv2 services over a single paying access auxiliary platform $10_i$ that includes the following stages:
a) When connecting to the auxiliary platform $10_i$, the SCP opens a communication detail DC0. The connection time to the auxiliary platform $10_i$ is counted from the moment the auxiliary platform $10_i$ is off-hook.
b) (Valo, Aut, ApTar)=(1, 1, 1). Value increase of communication detail DC0, authorisation request on service 1, and opening of CD1.
c) (Valo, Aut, ApTar)=(1, 1, 1). Value increase of communication detail DC1, authorisation request for the return to the general menu (essentially to determine the credit remaining of a limited card after consulting service 1), and opening of communication detail CD2.
d) (Valo, Aut, ApTar)=(1, 1, 1). Value increase of communication detail DC2, authorisation request on service 2, and opening of CD3.
e) (Valo, Aut, ApTar)=(1, 1, 1). Value increase of communication detail DC3, authorisation request for the return to the general menu, and opening of communication detail CD4.
f) (Valo, Aut, ApTar)=(1, 0, 0). Value increase of communication detail DC4.

Note that the time reference is always based on the SCP-Card clock. The start and end times of service queries must be saved by the SCP. The auxiliary platform $10_i$ must therefore formulate its authorisation and service value increase query according to the nature of the service (auxiliary platform $10_i$ internal service, call joined by the auxiliary platform $10_i$, or call joined by the SCP-Card) and indicate to the SCP when the time should be obtained. The input parameters involved are the triplet (Valo, Aut, ApTar) and the Application_tarif_immédiate indicator:

In the case of an auxiliary platform $10_i$ internal service (specific voice menu of the auxiliary platform $10_i$), the auxiliary platform $10_i$ must increase the value of its authorisation and service value increase request with (Valo, Aut, ApTar)=(x,1,1) and Application_tarif_immédiate=YES. The SCP saves the start time of the service query just after the communication detail CD is opened. The end of the service query is indicated by a second query with (Valo, Aut, ApTar)=(1,x,x,).

In the case where the service is a call joined by the auxiliary platform $10_i$, the auxiliary platform $10_i$ must increase the value of an initial authorisation and service value increase request with (Valo, Aut, ApTar)=(x,1,0). The auxiliary platform $10_i$ joins the call. When the called party goes off-hook, it sends the SCP-Card a second authorisation and service value increase query with (Valo, Aut, ApTar)= (0,0,1) and the Application_tarif_immédiate=YES. When the user hangs up, the auxiliary platform $10_i$ sends a third query with (Valo, Aut, ApTar)=(1,x,x,) to indicate the end of the conversation to the SCP-Card.

In the case where the service is a call joined by the SCP-Card: the auxiliary platform $10_i$ must increase the value of an initial authorisation and service value increase request with (Valo, Aut, ApTar)=(x,1,0). The SCP-Card recovers the conversation start and end times on the ANM/CON and REL signals without indication from the auxiliary platform $10_i$.

FIG. 15 represents a table that illustrates the parameters received from the auxiliary platform $10_i$ for this authorisation and service value increase query.

The ModeTax1 field is increased in value by the auxiliary platform $10_i$ according to the ModeTax2 parameter value of the previous service value increase.

By way of example, a subscriber with a limited card chooses to query a paying service offered by the auxiliary platform $10_i$. The latter sends the SCP-Card an authorisation and service value increase request with (Valo, Aut, ApTar) =(absent, present, present). The SCP-Card performs an SdT inquiry during the query processing to find the charge method applied to the service and communicates it to the auxiliary platform $10_i$ in its response (ModeTax2). The auxiliary platform $10_i$ might not use this value during processing but it saves it until the user finishes querying the service. Once the query is completed, the auxiliary platform $10_i$ sends the SCP-Card an authorisation and service value increase request configured with (Valo, Aut, ApTar)= (present, absent, absent) by recalling the type of charges applied to the service in the ModeTax1 field. Thus, there is no confusion for the SCP-Card regarding the service value increase mode.

ModeTax1 is equal to 0 (normal cost), 1 (inclusive cost), 2 (toll free), or 3 (ITX charges).

ModeTax1 is absent if Valo=0.

The Numéro field accepts all the available formats: national, short or long distance unlocalised, special, international, abbreviated, or private.

The AnnCrédit=1 field allows the auxiliary platform $10_i$ to request that the credit announcement be exceptionally transmitted by the SCP-Card in Voice Server Equipment (VSE) mode.

The Numéro and AnnCrédit fields are absent when Aut is absent.

The Application_tarif_immédiate field is absent when ApTar is absent.

In the case where the auxiliary platform query to a CARD-Card is a number call request, it also takes into account the case of a routing request to an operator set after an input error occurs or when the user fails to input anything. The auxiliary platform $10_i$ may precede the number call request with an authorisation service value increase query on this number. For example:

for an ordinary requested number, the auxiliary platform $10_i$ would have performed an authorisation/service value increase request on the called party number in order to verify the minimum value that the number can have during routing.

for an operator set access number: the numbers are already available in the operating data of the SCP-Card in network format. They can be routed and used in the CREATE operation without the SCP-Card needing additional analysis.

When the call return is distributed, the auxiliary platform $10_i$ is completely released. Reconnection to the auxiliary platform $10_i$ will be performed in the following three circumstances:

when the calling party wishes to interrupt the call currently being established;

when a timeout occurs due to a no answer from the called party;

or possibly, after the conversation to offer call concatenation.

The SCP-Card will indicate to the auxiliary platform $10_i$ that the recovery point of the voice script is "enter asterisk," "no answer from called party," or "call concatenation" using the value indicated in the Contexte_A entréeDialSE field in the initialisation response.

FIG. 16 represents a table that illustrates the parameters received from the auxiliary platform $10_i$.

The NumDdé field is optional and operates as follows:

NumDdé is absent if the auxiliary platform $10_i$ has previously transmitted an authorisation/service value increase request. The SCP-Card has already saved the called party network number (in the CREATE operation format) and its nature (national, international, etc.) after having analysed the Numéro field of the authorisation/service value increase request.

NumDdé is absent if the auxiliary platform $10_i$ performs a call request to an operator set. The Appel_opérateur field is set to YES in this case.

NumDdé is directly a national network number that can be routed if the auxiliary platform $10_i$ wishes to establish communication to a requested number without previous authorisation/service value increase.

The RappelSE=0 field indicates to the SCP-Card that it must recontact the auxiliary platform $10_i$ after the called party has hung up. If the RappelSE field is set to 1, the auxiliary platform is not recalled and the possible call concatenations will be offered in the without control interfaces mode.

If the RappelSE field is set to 2, the auxiliary platform $10_i$ is not recalled and no call concatenation is offered in the without control interfaces mode.

Note that the CARD-Card does not implement any call concatenation without control interfaces (PCS/OSV mode) if the nature of the auxiliary platform $10_i$ is that it can be called by the SCP in control interface mode when the SCP receives the Provide-Instructions command, because, in this case, the auxiliary platform $10_i$ carries the entire user interface of the service. In this example, RappelSE should never be equal to 1.

The Appel_opérateur field allows the SCP-Card to perform certain additional processes specific to the retransmission to the operator: network operator number search in the operating tables, transmission of an announcement to the operator once off-hook, etc.

Note that the Contexte_B field containing information that is useful to the auxiliary platform $10_i$ for recovering its voice script should be systematically transmitted to the SCP-Card with the number call query because, on each call, the auxiliary platform $10_i$ cannot know if there will be "input asterisk" or "no answer from called party" type recovery points.

On the other hand, the auxiliary platform $10_i$ will still indicate to the SCP if it wants to be recontacted or not after a successful calling party-called party conversation by increasing the value of the input parameter RappelSE field of a number call query.

The invention claimed is:

1. User access device to intelligent services of an intelligent network (IN) comprising a service control point (2) that communicates with at least one group of physical entities (4, 6, 8) designed to provide at least one initial service element, and with several auxiliary platforms ($10_i$) designed to provide the user with the additional service elements that complete the initial service element, device characterised in that it also comprises a communication interface (12) that allows an auxiliary platform ($10_i$) to send service element execution queries to the service control point (2) in real time, and to receive data from this service control point (2) as a response that allows executing additional services, wherein the auxiliary platform ($10_i$) ensures the following additional services:
- a—user information when using the service;
- b—user invitation to determine user choices;
- c—collection of user choices;
- d—activation and concatenation of actions (a), (b) and (c);
- e—concatenation of actions (a), (b) and (c) with other actions that do not stem from the platform but that are outsourced to the service control point (2) or to the physical entities (4, 6, 8) via the service control point (2), through service execution queries transmitted to the service control point (2).

2. Device according to claim 1, characterised in that auxiliary platform ($10_i$) is an intelligent peripheral.

3. Device according to claim 1, characterised in that auxiliary platform ($10_i$) is a service control point of a second intelligent network.

4. Device according to claim 1, characterised in that the initial service element execution query transmitted by the auxiliary platform is either a user authentication request, an access authorisation request, or a number call request.

5. Device according to claim 1, characterised in that the queries are sent to the service control point (2) in direct mode according to the TCP/IP protocol.

6. Device according to claim 1, characterised in that the queries are sent to the service control point (2) in direct mode according to the SS7 protocol.

7. Device according to claim 1, characterised in that the queries are sent to the service control point (2) in relay mode through the same channel that is used for voice signalling.

8. Device according to claim 1, characterised in that for a given service, the queries sent to the service control point (2) have the same format regardless of the transmitting auxiliary platform ($10_i$), and the data sent by the service control point (2) to the auxiliary platform ($10_i$) have the same format.

9. Device according to claim 1, characterised in that the physical entity group comprises at least one access switch (6), and at least one service management point (8) or equivalent function residing in the service control point (2).

10. User access method to the IN services of an intelligent network comprising a service control point (2) that communicates with at least one group of physical entities (4, 6, 8) designed to provide at least one initial service element, and several auxiliary platforms ($10_i$) designed to provide the user with additional elements that complete the initial service element, said procedure being characterised in that it comprises the following stages:
- real-time sending by the auxiliary platform ($10_i$) to the service control point (2) of at least one execution query of service elements dedicated to the service control point (2);
- sending by the service control point (2) in response to said transmitting auxiliary platform ($10_i$) of data that allows the transmitting auxiliary platform ($10_i$) to execute additional services,
- wherein, for a given service, the queries sent to the service control point (2) have the same format, regardless of the transmitting auxiliary platform ($10_i$), and the data sent by the service control point (2) to said transmitting auxiliary platform ($10_i$) has the same format.

11. User access method according to claim 10, characterised in that the first service element that can be executed by the service control point (2) and requested by the auxiliary platform ($10_i$) at the service control point using a query, comprises either a user authentication stage, a service access authorisation stage, or a number call stage.

* * * * *

UNITED STATES PATENT AND TRADEMARK OFFICE
CERTIFICATE OF CORRECTION

PATENT NO.        : 7,194,081 B2                                    Page 1 of 1
APPLICATION NO. : 10/415727
DATED             : March 20, 2007
INVENTOR(S)       : Thierry Boussageon It is certified that error appears in the above-identified patent and that said Letters Patent is hereby corrected as shown below:

On the title page, under section (56) References Cited, after Foreign Documents, please add:
              --OTHER PUBLICATIONS
Steven D. Silberstang, "Service Creation for Advanced Intelligent Networks Utilizing Intelligent Peripherals", Jan. 1996, in: Annual Review of Communications, pp. 911-918.--

Signed and Sealed this

Seventh Day of April, 2009

JOHN DOLL
*Acting Director of the United States Patent and Trademark Office*